US006752104B2

(12) United States Patent
Fiveland et al.

(10) Patent No.: US 6,752,104 B2
(45) Date of Patent: Jun. 22, 2004

(54) SIMULTANEOUS DUAL MODE COMBUSTION ENGINE OPERATING ON SPARK IGNITION AND HOMOGENOUS CHARGE COMPRESSION IGNITION

(75) Inventors: Scott B. Fiveland, Peoria, IL (US); Timothy E. Wiggers, Morton, IL (US)

(73) Assignee: Caterpillar Inc, Peoria, IL (US)

( * ) Notice: Subject to any disclaimer, the term of this patent is extended or adjusted under 35 U.S.C. 154(b) by 144 days.

(21) Appl. No.: 10/014,076

(22) Filed: Dec. 11, 2001

(65) Prior Publication Data

US 2003/0106520 A1 Jun. 12, 2003

(51) Int. Cl.[7] .................................................. F02B 3/00
(52) U.S. Cl. ..................................... 123/27 R; 123/294
(58) Field of Search .............................. 123/27 R, 294, 123/435, 316

(56) References Cited

U.S. PATENT DOCUMENTS

| | | |
|---|---|---|
| 2,186,043 A | 1/1940 | Rohlin ........................ 123/52 |
| 3,826,086 A | 7/1974 | Milisavljevic .............. 60/39.62 |
| 3,941,113 A | 3/1976 | Baguelin ..................... 123/179 |
| 4,250,850 A | 2/1981 | Ruyer ......................... 123/198 |
| 4,417,551 A | 11/1983 | Kronogård et al. ......... 123/198 |
| 4,455,984 A | 6/1984 | Merlini et al. .............. 123/481 |
| 4,473,044 A | 9/1984 | Hudson ...................... 123/198 |
| 4,700,663 A | 10/1987 | Dunn .......................... 123/1 R |
| 5,010,852 A | 4/1991 | Milisavljevic ............... 123/21 |
| 6,561,157 B2 * | 5/2003 | zur Loye et al. ........... 123/295 |

* cited by examiner

Primary Examiner—Bibhu Mohanty
(74) Attorney, Agent, or Firm—Todd T Taylor; Raymond W Campbell

(57) ABSTRACT

An engine particularly suited to single speed operation environments, such as stationary power generators. The engine includes a plurality of combustion cylinders operable under homogenous charge compression ignition, and at least one combustion cylinder operable on spark ignition concepts. The cylinder operable on spark ignition concepts can be convertible to operate under homogenous charge compression ignition. The engine is started using the cylinders operable under spark ignition concepts.

27 Claims, 2 Drawing Sheets

SIMULTANEOUS DUAL MODE COMBUSTION ENGINE OPERATING ON SPARK IGNITION AND HOMOGENOUS CHARGE COMPRESSION IGNITION

The Government of the United States of America has rights in this invention pursuant to Contract No. DE-FC05-97OR22605 awarded by the U.S. Department of Energy.

TECHNICAL FIELD

The present invention relates generally to the field of internal combustion engines, and more specifically to engines operated under spark ignition and homogenous charge compression ignition principles.

BACKGROUND

It has been known for many years to use spark ignition, or combustion ignition concepts in internal combustion engines. In the spark ignition design, a mixture of fuel and air is provided in a combustion cylinder and compressed. A spark plug initiates combustion through the creation of an open spark sufficient to ignite the air and fuel mixture in the cylinder. Both two and four stroke operating sequences are known.

In a direct injection combustion ignition engine, such as a diesel engine, it is common to use a two stroke operating sequence. On the downward stroke of a piston in a combustion cylinder, ports for air intake are opened and a charge of air is received in the combustion cylinder. Turbochargers are often used to supply the charge air at higher pressure and density than existing ambient conditions. On the upward stroke of the cylinder, the air intake ports are closed and the air is highly compressed. At the desired point of compression, fuel is sprayed into the cylinder by a fuel injector. The fuel ignites immediately, as a result of the heat and pressure inside the cylinder. The pressure created by the combustion of the fuel drives the piston downward in the power stroke of the engine. As the piston nears the bottom of its stroke, all of the exhaust valves open. Exhaust gases rush from the cylinder, relieving pressure in the cylinder. The intake ports are opened, and pressurized air fills the cylinder, forcing out the remaining exhaust gases. The exhaust valves close and the piston starts traveling back upward, the intake ports are closed and the fresh charge of air is compressed in the cylinder, in preparation for fuel injection. Four stroke designs also are known.

Engine emission standards have led to the investigation of engine operating and compression ignition alternatives. In one such alternative, referred to as homogenous charge compression ignition (HCCI), significant emission reductions have been experienced during initially testing. In an engine operating under HCCI concepts, the air and fuel are intimately mixed, typically at a high air/fuel ratio, before maximum compression in the combustion cylinder. As a result, each droplet of fuel is surrounded by an excess of combustion air. As compression occurs, the air temperature increases, and ultimately combustion is initiated at numerous locations throughout the cylinder. Typically, combustion commences at lower temperatures than for direct charge ignition, leading to reduced NOx emissions.

The use of homogenous charge compression ignition concepts have apparent benefits in substantial reduction of NOx emissions. However, two aspects of combustion control used regularly in more conventional engines are not available in an HCCI engine. The timing of ignition in an HCCI engine can be controlled neither indirectly by controlling the start of fuel injection as in a direct injection engine, nor directly by controlling spark initiation as in a spark ignition engine. Further, the rate of heat release can not be controlled via control of fuel injection, as in a direct injection engine, nor by flame propagation, as in a spark ignition engine. As a result, ongoing efforts for improving the HCCI concept include ways to control the ignition event in an HCCI engine. Incorporating the HCCI concept in multi-cylinder engine framework presents additional challenges in starting the engine. Further challenges to development of HCCI engine concepts include the incorporation of turbochargers.

Multi-fuel, hybrid engines are known. U.S. Pat. No. 5,010,852 discloses an engine operable in both two stroke and multistroke working cycles.

The present invention is directed to overcoming one or more of the problems as set forth above.

SUMMARY OF THE INVENTION

In one aspect of the invention, an internal combustion engine is provided with a plurality of combustion cylinders operable under homogenous charge compression ignition concepts, and at least one combustion cylinder operable on one of spark ignition concepts and direct injection ignition concepts.

In another aspect of the invention, a work machine is provided with an engine including a plurality of combustion cylinders operable under homogenous charger compression ignition concepts; and at least one combustion cylinder operable under one of spark ignition concepts and direct injection ignition concepts.

In a further aspect of the invention, a method for operating an internal combustion engine is provided with steps of providing a plurality of combustion cylinders; operating the plurality of combustion cylinders under homogenous charge compression ignition concepts; providing at least one further combustion cylinder; and operating the at least one further cylinder under spark ignition concepts.

DETAILED DESCRIPTION

Figure 1:
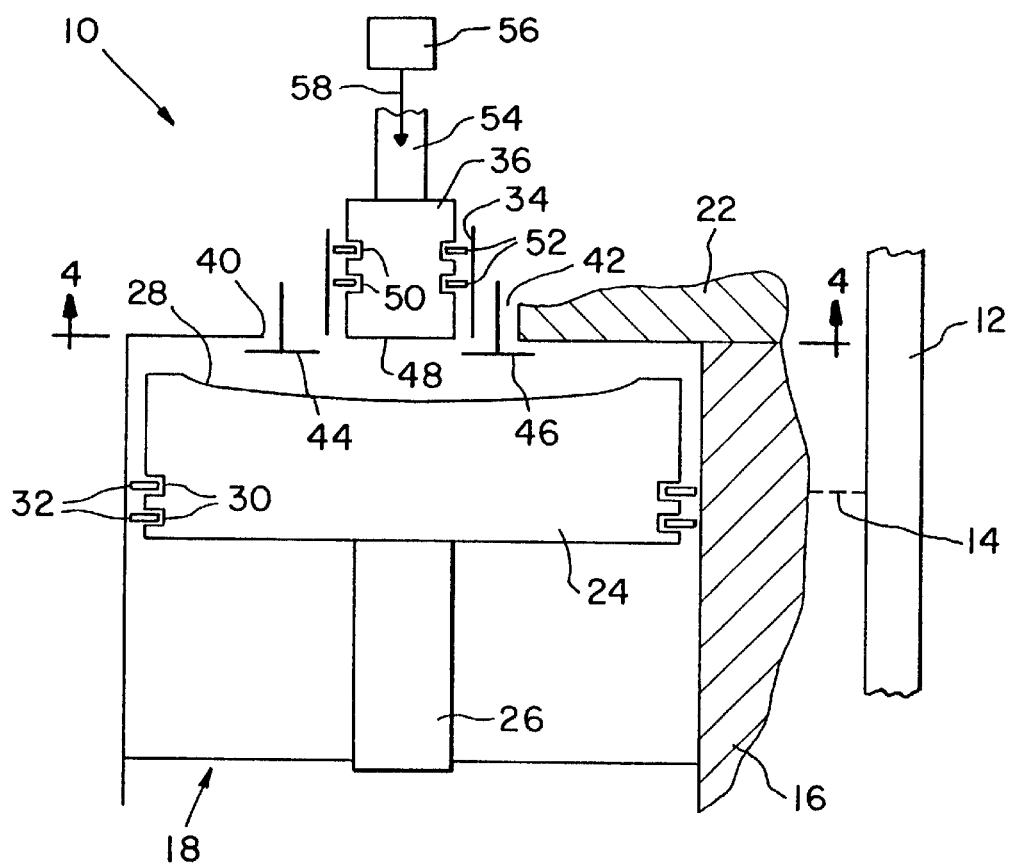
FIG. 1 is a sectional, partially fragmentary view of an embodiment of an internal combustion engine of the present invention within a work machine.
Figure 4:
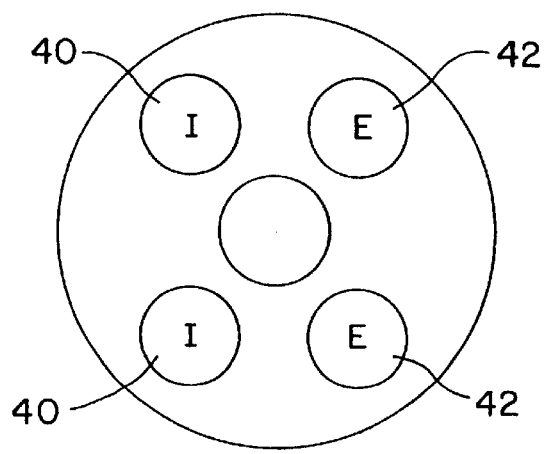
FIG. 4 is a cross-sectional view taken along line 4—4 of FIG. 1.
Figure 2:
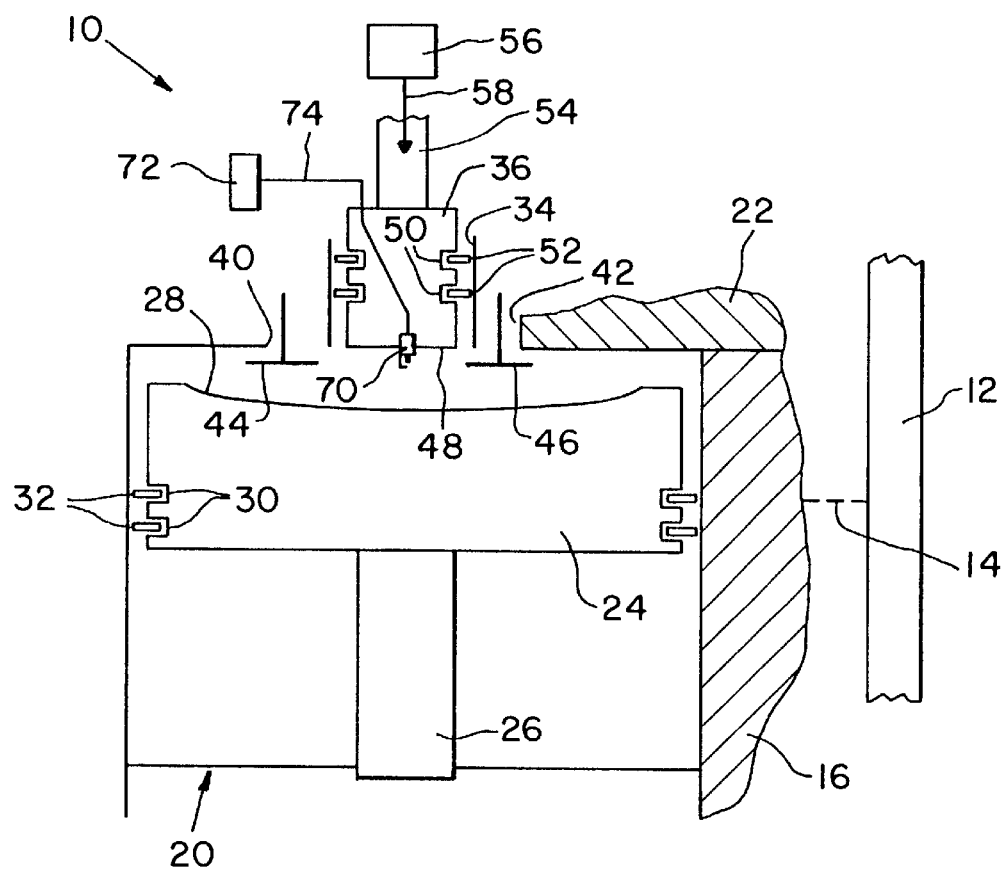
FIG. 2 is a sectional, partially fragmentary view of a preferred combustion cylinder for the internal combustion engine shown in FIG. 1.

Referring now to the drawings, and more particularly to FIGS. 1 and 2, there is shown an embodiment of an internal combustion engine 10 of the present invention which is incorporated within a work machine such as an on-road vehicle, off-road vehicle, tractor, excavator or the like. An engine 10 according to the present invention is particularly suited to engines intended primarily for stationary single-speed operation installations, such as, for example, powering a generator. The work machine includes a frame 12 that carries internal combustion engine 10, as designated schematically by phantom line 14.

Engine 10 includes an engine block 16 that defines one or more combustion cylinders and typically defines a plurality of combustion cylinders, which in preferred embodiments may be four, six, eight, twelve, sixteen or twenty combustion cylinders. In accordance with the present invention, at least one, and more preferably a plurality or all of combustion cylinders 18 are designed and controlled to be operable under homogenous charge compression ignition (HCCI) concepts, and at least one combustion cylinder 20 (FIG. 2) and more preferably a plurality or all are designed and controlled to be operable under spark ignition concepts. A head 22 is provided on block 16 above all cylinders 18 and 20.

While in most applications of the present invention a plurality of cylinders 18 are operable under HCCI concepts, for purposes of simplicity, only one such cylinder 18 operable under HCCI concepts is shown in the drawings. A primary piston 24 is reciprocally disposed within combustion cylinder 18, and movable between a top dead center position adjacent head 22 (as shown in FIG. 1) and a bottom dead center position at an opposing end of combustion cylinder 18. Primary piston 24 includes a rod 26 coupled therewith on a side opposite from head 22.

Primary piston 24 also includes a crown 28 having a predefined contour that assists in mixing the fuel and air mixture which is injected into combustion cylinder 18. The particular contour of crown 28 may vary, depending on the particular application. Fuel also can be provided premixed, as in a stationary natural gas engine. Primary piston 24 also includes one or more annular piston ring grooves 30 in the exterior periphery thereof, which each carry a respective piston ring 32. Piston rings 32 prevent blow-by of combustion products during a combustion cycle, as is known. Primary piston 24 may also be configured without piston ring grooves 30 and piston rings 32, depending upon the particular application.

Head 22 includes a secondary cylinder 34 that is in communication with HCCI combustion cylinder 18. A secondary piston 36 is reciprocally disposed in secondary cylinder 34. Head 22 also includes a pair of intake ports 40 and exhaust ports 42 in which a corresponding pair of intake valves 44 and exhaust valves 46 are reciprocally disposed. Intake valves 44 and exhaust valves 46 are actuated in known manner during operation of internal combustion engine 10, as primary piston 24 reciprocates between the top dead center position and the bottom dead center position, and vice versa.

Secondary cylinder 34 has a generally cylindrical shape in the embodiment shown, and preferably is positioned generally concentrically with combustion cylinder 18 and primary piston 24. However, it is also possible to position secondary cylinder 34 offset relative to a longitudinal axis of primary piston 24, depending upon the particular application. Regardless, secondary cylinder 34 is positioned adjacent combustion cylinder 18, so as to affect the fluid dynamics and chemical kinetics of the fuel and air mixture during the combustion process when primary piston 24 is at or near the top dead center position as shown in FIG. 1.

Secondary piston 36 is reciprocally disposed within secondary cylinder 38, and movable between a top dead center position adjacent combustion cylinder 18 (as shown in FIG. 1) and a bottom dead center position at an opposite end of secondary cylinder 34. Secondary piston 36 includes a crown 48 with a predefined contour, depending upon the particular application. In the embodiment shown, crown 48 is generally flat, but may also have a curved surface or compound curvature, depending upon the particular application.

Secondary piston 36 includes a pair of piston ring grooves 50 that respectively carry a pair of piston rings 52. Piston rings 52 are configured to inhibit blow-by of combustion products during combustion of the fuel and air mixture within combustion cylinder 18. A rod 54 is coupled with secondary piston 36, and is directly or indirectly coupled with an actuator 56 as indicated by line 58. Secondary piston 36 is reciprocated within secondary cylinder 34 to affect the combustion timing of the fuel and air mixture within combustion cylinder 18, as primary piston 24 reciprocates between a compression stroke and a return stroke within combustion cylinder 18.

Figure 3:
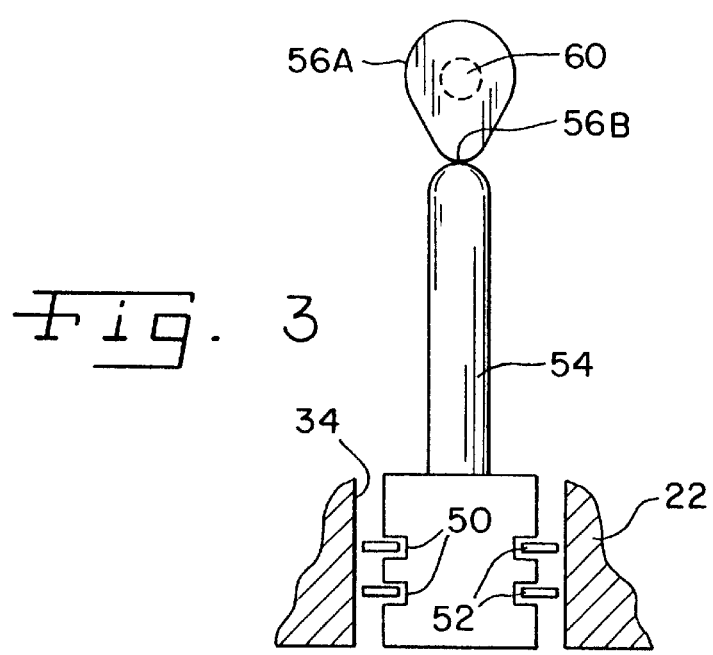
FIG. 3 is a schematic illustration of a cam actuator coupled with the secondary piston.

Actuator 56 controls the reciprocating position of secondary piston 36, depending upon a position of primary piston 24. Actuator 56 may be configured as a cam actuator or a hydraulic actuator, depending upon the particular application. When configured as a cam actuator (shown generally in FIG. 3), actuator 56 includes a cam 56A having a flat cam profile portion 56B which causes secondary piston 36 to remain at the top dead center position to thereby "hang" at the top dead center position for a predetermined period of time. Cam 56A is rotatably driven about a shaft 60, preferably through interconnection with a cam shaft (not shown) associated with primary piston 24 so as to rotate cam 56A depending upon movement of primary piston 24.

As indicated above, actuator 56 may also be configured as a hydraulic actuator. When configured as a hydraulic actuator, rod 54 thus acts as a plunger shaft for reciprocating secondary piston 36 between the top dead center position and the bottom dead center position. When configured as a hydraulic actuator, it will be appreciated that secondary piston 36 may be moved to or through any desired location within secondary cylinder 34. Thus, the top dead center position and bottom dead center position of secondary piston 36 may vary. By varying the top dead center position of secondary piston 36, the effective compression ratio of primary piston 24 and combustion chamber 18 may likewise be varied.

In the embodiment shown, secondary piston 36 and secondary cylinder 34 each have a generally cylindrical shape (i.e., generally circular cross-sectional shape). However, depending upon the particular application, it may also be possible to configure secondary piston 36 and secondary cylinder 34 with a different cross-sectional shape while still allowing effective reciprocation of the secondary piston within the secondary cylinder.

As stated previously, at least one cylinder 20 of engine 10 is operable under spark ignition concepts. While standard combustion cylinders for spark ignition may be used, the design of which are well-known to those skilled in the art, a suitable embodiment is illustrated in FIG. 2. Cylinder 20 illustrated in FIG. 2 is operable under both spark ignition, and HCCI concepts. Cylinder 20 is similar to cylinder 18, and components in combustion cylinder 20 that are similar to corresponding components of combustion cylinder 18 are identified with similar numbers as in FIG. 1. Combustion cylinder 20 further includes a spark plug 70 and an ignition coil 72 associated therewith, such as via a spark plug wire 74, in known manner for spark ignition operation of combustion cylinder 20. Spark plug 70 is illustrated to be at the end of secondary piston 36, at the center of cylinder 20. However, spark plug 70 may be secured in head 22, preferably at the axial center of cylinder 20, in which case secondary cylinder 34 may be positioned outwardly from the axial center of cylinder 20.

Advantageously, engine 10 can have all dual mode operating combustion cylinders 20, which can operate under either spark ignition concepts, or HCCI concepts. Use of all cylinders 20 provides the greatest degree of operating freedom, as will be described hereinafter. Further, while advantages relating to engine starting are realized when cylinder 20 is operated under spark ignition concepts, as an alternative, cylinder 20 can be operated under direct injection combustion ignition concepts. When direct injection combustion ignition is used, spark plug 70, coil 72 and wire 74 are not required, and a fuel injector and other standard components for direct injection ignition, well-known to those skilled in the art, are used.

INDUSTRIAL APPLICABILITY

During startup of engine 10, one or more of cylinders 20 operable under spark ignition concepts are operated in the spark ignition mode. The number of cylinders operated under spark ignition concepts during engine startup can vary, but is expected to be between about 20% and 50% of the total number of cylinders 18 and cylinders 20 in engine 10. It should be understood, however, that more or fewer of the total number of cylinders 18 and 20 in engine 10 may be so operated during startup, and if engine 10 has all cylinders 20 operable under spark ignition concepts all may be so operated during startup. If a dual mode cylinder 20, as illustrated in FIG. 2, is used, secondary piston 36 is retracted to match a standard spark ignition compression ratio. Standard spark ignition operation follows, and continues until such time as the engine operation stabilizes. Advantages may be obtained if spark ignition operation follows so-called Miller cycle principles, with late intake valve closing, as those skilled in the art will readily understand. This reduces peak compression pressure, shown to slow flame propagation and reduce peak temperatures that can effect end-gas auto-ignition.

After engine operation has stabilized, operation of cylinders 18 operable under HCCI concepts is commenced. For cylinders 18, as shown in FIG. 1, that are not capable of dual mode operation, cylinder startup is as standard for HCCI concepts. For cylinders 20 capable of dual mode operation, conversion from spark ignition operation to operation under HCCI concepts is begun. During conversion from spark ignition operation to HCCI operation, the engine computer gradually begins to increase the compression ratio and lean out the air/fuel mixture through air or exhaust gas dilution. Transitioning from spark ignition operation to HCCI operation can be done gradually, with only one or a few cylinders 20 at a time. If engine 10 includes only cylinders 20 capable of dual mode operation, all cylinders 20 may be transitioned to HCCI operation.

During operation under HCCI concepts, primary piston 24 is reciprocated within combustion cylinder 18 or 20, between the bottom dead center position and the top dead center position as shown in FIG. 1, and vice versa. As primary piston 24 moves from the bottom dead center position to the top dead center position, intake valves 44 are actuated to draw in combustion air and/or an air and fuel mixture. A separate fuel injector (not shown) may also be provided. When primary piston 24 is at or near the top dead center position, and preferably shortly before the top dead center position, secondary piston 36 is likewise actuated and moved to the top dead center position adjacent combustion cylinder 18 or 20. This effectively causes a rapid decrease in the combined volumes of combustion cylinder 18 or 20 and its associated secondary cylinder 34, causing rapid compression of the air/fuel mixture. Sufficient energy is imparted to the fuel and air mixture within combustion cylinder 18 or 20 to cause the fuel and air mixture to combust. Secondary piston 36 is preferably held at the top dead center position for a predetermined period of time to maintain the total volume at a minimum. When actuator 24 is constructed as a cam actuator, this is accomplished through flat cam profile 56B of cam 56A. When configured as a hydraulic actuator, secondary piston 36 is simply held at the top dead center position by applying sufficient hydraulic pressure to rod 54.

After combustion, primary piston 24 is moved from the top dead center position toward the bottom dead center position. Secondary piston 36 is concurrently moved toward its bottom dead center position to effectively increase the total communicating volume area. In the case of using hydraulic actuator 24, the bottom dead center position of secondary piston 36 may also be varied to in turn vary the compression ratio of internal combustion engine 10. The process repeats for each cycle of primary piston 24 between the bottom dead center position and top dead center position, and vice versa.

As primary piston 24 moves toward the bottom dead center position, exhaust valves 46 are actuated to allow exhaust gas to exit from the combustion chamber within combustion cylinder 20.

By varying the timing of secondary piston 36, it is possible to likewise vary the timing of the combustion sequence occurring within combustion cylinder 20. Thus, it is possible to indirectly control the combustion sequence of the fuel and air mixture within combustion cylinder 20 using secondary piston 36.

Operation of engine 10 in accordance with the present invention is fuel independent, and any conventional fuel for internal combustion engines can be used. While shown and described for spark ignition and HCCI operating principles, instead of spark ignition, compression ignition direct injection (CIDI) can be used, eliminating the need for spark plugs 70 and coil 72. After engine 10 has been started using SI or CIDI principles, the benefits of HCCI principles can be gained by terminating some or all of the operation under SI or CIDI cylinders. With the use of a combination of HCCI and SI or CIDI cylinders, the difficulties relating to turbocharging HCCI engines, resulting from low exhaust gas enthalpy, are reduced. Operation of the engine can be changed, as conditions mandate, between primarily HCCI operation and more or less operation under SI and/or CIDI principles, with little or no operation under HCCI. For example, during periods of engine idling, it may be advantageous to reduce the operation under HCCI principles.

In accordance with the present invention, it is possible to maximize the number of cylinders operating under HCCI concepts for the given operating conditions. Operation under spark ignition concepts facilitate engine startup, and conversion to HCCI can be partial or total, depending on the use of engine 10, to maximize emission reduction benefits. If the engine enters an idle phase, or other operating condition for which HCCI operation is not beneficial, operation of some or all cylinders 20 can be stopped or converted to spark ignition operation. In some installations, continuous operation of some cylinders 20 using spark ignition concepts can be advantageous.

Other aspects, objects and advantages of this invention can be obtained from a study of the drawings, the disclosure and the appended claims.

What is claimed is:
1. An internal combustion engine comprising:
a total number of combustion cylinders;
a plurality of said total number of combustion cylinders operable under homogenous charge compression ignition concepts; and at least one combustion cylinder and less than said total number of combustion cylinders operable on one of spark ignition concepts and combustion ignition direct injection concepts.

2. The engine of claim 1, at least 50% of said total number of combustion cylinders operable under homogenous charge compression concepts.

3. The engine of claim 2, said total number of combustion cylinders being at least eight.

4. The engine of claim 2, said total number of combustion cylinders being at least twelve.

5. The engine of claim 2, said total number of combustion cylinders being at least sixteen.

6. The engine of claim 1, said at least one combustion cylinder operable under spark ignition concepts using Miller cycle principles.

7. The engine of claim 6, at least 50% of said total number of combustion cylinders operable under homogenous charge compression concepts.

8. The engine of claim 6, said engine designed for single speed operation.

9. The engine of claim 1, said engine designed for single operation.

10. The engine of claim 1, said at least one combustion cylinder operable on one of spark ignition concepts and combustion ignition direct injection concepts also being operable under homogenous charge compression ignition concepts.

11. A work machine comprising:
   a driven component; and
   an engine drivingly coupled to said component, said engine including;
      a total number of combustion cylinders;
      a plurality of said total number of combustion cylinders operable under homogenous charger compression ignition concepts; and
      at least one combustion cylinder and less than said total number of combustion cylinders operable under one of spark ignition concepts and combustion ignition direct injection concepts.

12. The work machine of claim 11, said driven component being a generator.

13. The work machine of claim 11, at least 50% of said total number of combustion cylinders operable under homogenous charge compression concepts.

14. The work machine of claim 13, said total number of combustion cylinders being at least eight.

15. The work machine of claim 13, said total number of combustion cylinders being at least twelve.

16. The work machine of claim 13, said total number of combustion cylinders being at least sixteen.

17. The work machine of claim 11, said at least one combustion cylinder operable under spark ignition concepts using Miller cycle principles.

18. The work machine of claim 17, at least 50% of said total number of combustion cylinders operable under homogenous charge compression concepts.

19. The work machine of claim 11, said engine designed for single speed operation.

20. The work machine of claim 19, said driven component being a generator.

21. The work machine of claim 20, said at least one combustion cylinder operable under spark ignition concepts using Miller cycle principles.

22. The work machine of claim 11, said at least one combustion cylinder also being operable under homogenous charge compression ignition concepts.

23. A method for operating an engine, comprising:
   providing a plurality of combustion cylinders;
   starting the engine by operating at least one of said plurality of combustion cylinders and less than all of said combustion cylinders under one of spark ignition concepts and combustion ignition direct injection concepts; and
   after said first step of starting the engine, operating at least one of said cylinders under homogenous charge compression ignition concepts.

24. The method of claim 23, including controlling said engine to a single speed operation.

25. The method of claim 23, including operating at least one cylinder under spark ignition concepts using Miller cycle principles.

26. The method of claim 23, including converting operation of at least one cylinder from one of spark ignition concepts and combustion ignition direct injection concepts to homogenous charge compression ignition concepts after said starting step.

27. An internal combustion engine, comprising:
   a plurality of combustion cylinders;
   means for starting the engine by operating at least one of said plurality of combustion cylinders and less than all of said combustion cylinders under one of spark ignition concepts and combustion ignition direct injection concepts; and
   means for operating at least one of said cylinders under homogenous charge compression ignition concepts after said engine has been started.

* * * * *